(12) United States Patent
Vogt et al.

(10) Patent No.: US 7,920,144 B2
(45) Date of Patent: Apr. 5, 2011

(54) METHOD AND SYSTEM FOR VISUALIZATION OF DYNAMIC THREE-DIMENSIONAL VIRTUAL OBJECTS

(75) Inventors: Sebastian Vogt, Lawrenceville, NJ (US); Frank Sauer, Princeton, NJ (US); Ali Khamene, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 679 days.

(21) Appl. No.: 11/328,562

(22) Filed: Jan. 10, 2006

(65) Prior Publication Data

US 2006/0161572 A1    Jul. 20, 2006

Related U.S. Application Data

(60) Provisional application No. 60/644,826, filed on Jan. 18, 2005.

(51) Int. Cl.
*G06T 15/70* (2006.01)

(52) U.S. Cl. ............................................ 345/475
(58) Field of Classification Search .................. 345/951
See application file for complete search history.

(56) References Cited

U.S. PATENT DOCUMENTS

| | | | | |
|---|---|---|---|---|
| 5,692,117 | A * | 11/1997 | Berend et al. ................ | 345/475 |
| 5,852,450 | A * | 12/1998 | Thingvold .................... | 345/473 |
| 6,034,695 | A * | 3/2000 | Silva et al. .................... | 345/619 |
| 6,166,744 | A * | 12/2000 | Jaszlics et al. ................ | 345/629 |
| 6,803,915 | B2 * | 10/2004 | Takakura et al. ............. | 345/473 |
| 6,822,653 | B2 * | 11/2004 | Boyd et al. .................... | 345/474 |
| 2003/0179204 | A1* | 9/2003 | Mochizuki et al. ........... | 345/473 |
| 2004/0012592 | A1* | 1/2004 | Lanciault ...................... | 345/473 |
| 2004/0104935 | A1* | 6/2004 | Williamson et al. .......... | 345/757 |

OTHER PUBLICATIONS

Randi J. Rost, John M. Kessenich, Berthold Lichtenbelt, "OpenGL Shading Language: Shading Language," 2004, pp. 318-320.*
Vacchetti, L. et al., "Stable Real-Time Interaction Between Virtual Humans and Real Scenes," Oct. 6, 2003, Fourth International Conference on 3-D Digital Imaging and Modeling (3DIM '03).*
Randima Fernando, Mark J. Kilgard, the Cg tutorial: the definitive guide to programmable real-time graphics 4th Ed., 2003, Published by Addison-Wesley, pp. 13-20.*
Guy Zimmerman, Julie Barnes and Laura Leventhal, "Building User-Controlled 3D Models and Animations for Inherently-3D Construction Tasks: Which Tool, Which Representation?", 2001, in Engineering for Human-Computer Interaction, M. Reed Little and L. Nigay (Eds.).*
Guy Zimmerman, Julie Barnes, Laura Leventhal, "A comparison of the usability and effectiveness of web-based delivery of instructions for inherently-3D construction tasks on handheld and desktop computers," Mar. 9 2003, in Proceedings of the Eighth International Conference on 3D Web Technology.*
Randi J. Rost, John M. Kessenich, Berthold Lichtenbelt, "OpenGL Shading Language: Shading Language," 2004, pp. 5, 9, 10, 40-42, 318-320.*
Guy Zimmerman, Julie Barnes and Laura Leventhal, "Building User-Controlled 3D Models and Animations for Inherently-3D Construction Tasks: Which Tool, Which Representation?", 2001, in Engineering for Human-Computer Interaction, M. Reed Little and L. Nigay (Eds.).*

* cited by examiner

*Primary Examiner* — Jason M Repko
(74) *Attorney, Agent, or Firm* — Donald B. Paschburg; F. Chau & Associates, LLC

(57) ABSTRACT

A method for visualization of dynamic three-dimensional (3D) virtual objects comprises storing a plurality of static 3D key-models respectively describing a dynamic 3D object in at least one of a number of poses and shapes; and rendering the dynamic 3D object by interpolation of the 3D key-models by performing the interpolation in a vertex shader program of a programmable graphics processing unit (GPU).

40 Claims, 3 Drawing Sheets

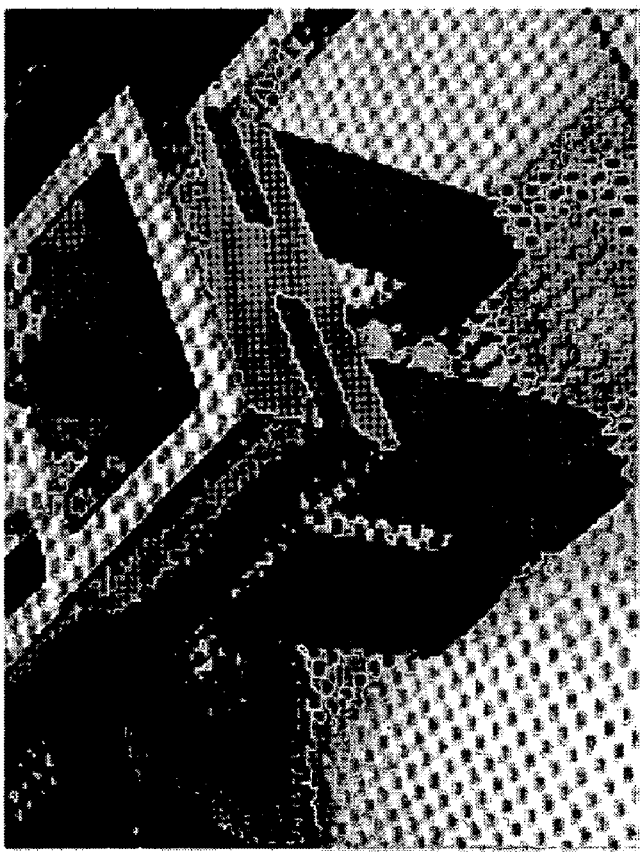
FIG. 4B
FIG. 4A

METHOD AND SYSTEM FOR VISUALIZATION OF DYNAMIC THREE-DIMENSIONAL VIRTUAL OBJECTS

CROSS-REFERENCE TO RELATED APPLICATION AND CLAIM OF PRIORITY

Specific reference is hereby made to U.S. Provisional Patent Application No. 60/644,826 filed Jan. 18, 2005, in the names of inventors Sebastian Vogt, Frank Sauer, and Ali Khamene, and entitled VISUALIZATION OF DYNAMIC 3D OBJECTS BASED ON STATIC 3D KEY-MODELS AND REAL-TIME INTERPOLATION ON A GPU, and whereof the disclosure is hereby incorporated herein by reference and whereof the benefit of priority is claimed.

FIELD OF THE INVENTION

The present invention relates to the computerized display of three-dimensional (3D) objects and, more specifically, to the display of dynamic 3D objects.

BACKGROUND OF THE INVENTION

As used herein, a dynamic 3D object is defined as a three-dimensional virtual object that dynamically changes its shape through deformations or relative motions of its parts. The definition of dynamic can be extended to not only include geometrical changes but also changes in appearance, color, texture, and other attributes of the object. Examples of a dynamic 3D object are a virtual person walking or a virtual heart beating. A static 3D key-model is herein defined as a model of a dynamic 3D object in a fixed pose with a particular set of attributes. Typical representations are static wireframe or triangulated surface models, which can be stored, e.g., in form of VRML files.

Various computer graphics applications require the rendering of virtual three-dimensional (3D) objects, including dynamic 3D objects. Such virtual 3D objects are often created and modeled offline and then visualized later in a real-time scenario. In addition to geometry, color, and texture information, object motion and deformation are principal attributes of dynamic 3D objects. Examples of animated objects in the present sense include, for example, an animated figure, a deformable object, or a 3D object that changes its shape over time, or some combination of the foregoing and/or other attributes. One of these areas where a framework for displaying and rendering virtual objects is already intrinsic to its technology is Augmented Reality (AR) visualization. This is a technology that augments views of the real world with computer-generated objects. Optical or video images of the real world are combined with computer graphics in real time; real and virtual objects appear to coexist in the same scene.

Applications of AR can be found in manufacturing, healthcare, entertainment, infotainment, military, and other fields. See for example, Ronald Azuma, Yohan Baillot, Reinhold Behringer, Steven Feiner, Simon Julier, Blair MacIntyre, "Recent Advances in Augmented Reality," *IEEE Computer Graphics and Applications*, vol. 21, no. 6, pp. 34-47, 2001. For an example of a video-see-through AR system for computer assisted medical procedures, see F. Sauer, F. Wenzel, S. Vogt, Y. Tao, Y. Genc, and A. Bani-Hashemi, "Augmented Workspace: Designing an AR Testbed," IEEE and ACM Int. Symp. On Augmented Reality—ISAR 2000 (Munich, Germany, Oct. 5-6, 2000), pages 47-53; and Frank Sauer, U. Joseph Schoepf, Ali Khamene, Sebastian Vogt, Marco Das, and Stuart G. Silverman, "Augmented Reality System for CT-guided Interventions: System Description and Initial Phantom Trials," in *Proceedings of SPIE's Conference of Medical Imaging* 2003: *Visualization, Image-Guided Procedures, and Display*, vol. 5029, February 2003, pp. 384-394.

BRIEF SUMMARY OF THE INVENTION

Augmenting the real world with realistic-looking virtual 3D objects involves two main steps: first, accurate offline modeling of all relevant features of the virtual object, and second, proper representation and real time visualization of the object's attributes with the Augmented Reality system. If the AR system uses a head-mounted display, the graphics need to be updated instantaneously according to the user's head movements. Furthermore, if the system is interactive, the graphics needs to be updated practically instantaneously according to the user's actions. Real time performance of an AR system is generally essential in such applications. If the representation of a dynamic 3D object has to be integrated into an already existing visualization scheme, such as for example, rendering it into an existing OpenGL (Graphics Library) window next to other virtual objects, it is herein recognized that it is impracticable to use a dedicated viewer program for the dynamic 3D object.

It is further herein recognized that a solution to import the object's attributes and to visualize the dynamic 3D object within the given framework is needed.

Traditional methods for displaying dynamic 3D objects are mostly based on techniques that use Central Processing Unit (CPU) power to calculate intermediate states of dynamic 3D objects from pre-modeled static 3D key-models, known as vertex-blending, or from analytical descriptions of the movement. It is herein recognized that these kinds of models are difficult to integrate into an already existing visualization framework, as in the case of Augmented Reality applications. Furthermore, the shape calculation for complex objects cannot practicably be performed on the CPU in real time. It is herein recognized that either one pre-calculates all intermediate shapes and sacrifices the systems interactivity, which is not desirable for AR applications, or one simplifies the model, which again is an undesired limitation.

Professional modeling tools such as Maya, for example, can be utilized to create objects with complex characteristics and to export them into standard formats such a Virtual Reality Modeling Language (VRML2) viewer. If the representation of a dynamic 3D object has to be integrated into an already existing visualization scheme, such as for example, rendering it into an existing OpenGL window next to other virtual objects, it is impracticable to use a dedicated viewer program for the dynamic 3D object. A solution to import the object's attributes and to visualize the dynamic 3D object within the given framework becomes necessary.

In accordance with an aspect of the present invention a method is described for displaying dynamic 3D objects by means of programmable graphics hardware. The method uses several static 3D key-models that describe the dynamic 3D object in different poses or shapes. Standard modeling tools, e.g. Maya, can be used to generate these static 3D key-models. A central aspect of the method in accordance with invention comprises rendering the dynamic 3D object by way of a particular, hardware-assisted interpolation of the 3D key-models. With the vertex shader program of a highly vectorized graphics processing unit (GPU), which is available on today's graphics cards, the method achieves real-time animation of complex objects. Augmented Reality visualization, where computer graphics is overlaid onto an optical or video view of the real world, poses particularly high demands on rendering speed, and is an important area of application for the present invention.

In accordance with an aspect of the invention, a method for visualization of dynamic three-dimensional (3D) virtual objects, comprises: storing a plurality of static 3D key-models respectively describing a dynamic 3D object in at least one of a number of poses and shapes; and rendering the dynamic 3D object by interpolation of the 3D key-models by performing the interpolation in a vertex shader program of a programmable graphics processing unit (GPU).

In accordance with another aspect of the invention, performing the interpolation comprises performing real-time interpolation.

In accordance with another aspect of the invention, the step of storing a plurality of static 3D key-models comprises storing an indexed face-set describing a triangulated surface mesh with vertex indices wherein each vertex has a corresponding vertex in each of the other static 3D key-models of the plurality.

In accordance with another aspect of the invention, the step of storing an indexed face-set comprises storing only one indexed face-set, which is the same for all the static 3D key-models of the plurality.

In accordance with another aspect of the invention, the step of performing interpolation between the static 3D key-models comprises entering first and second vertex information of respective first and second static 3D key-models into respective attribute inputs of an OpenGI vertex.

In accordance with another aspect of the invention, the step of entering first and second vertex information comprises entering attributes, including any of color, texture, and normal vector information.

In accordance with another aspect of the invention, a method includees a step of coupling the virtual objects with an AR system for rendering 3D graphics including objects from a real world, augmented with the virtual dynamic 3D objects.

In accordance with another aspect of the invention, a method includes interacting the objects from a real world with the virtual dynamic 3D virtual objects.

In accordance with another aspect of the invention, wherein performing the interpolation comprises implementing real-time interpolation; controlling the interpolation by a single parameter; combining a plurality of basic movements in between static 3D key-models in a sequential order to describe particular complex dynamics of a dynamic 3D object; describing a particular action as a sequence of static 3D key-models; and scripting an animation sequence as a sequence of given actions.

In accordance with another aspect of the invention, a method for visualization of dynamic three-dimensional (3D) virtual objects, comprises: generating a plurality of static 3D key-models describing one of the plurality of dynamic 3D virtual objects in at least one of different poses and shapes; and utilizing programmable graphics hardware for rendering the dynamic 3D object by way of hardware-assisted interpolation of the 3D key-models.

In accordance with another aspect of the invention, the step of utilizing programmable graphics hardware comprises utilizing the vertex shader program of a programmable graphics processing unit (GPU) for performing the interpolation.

In accordance with another aspect of the invention, a, method includes a step of performing the recited steps for respective ones of the dynamic three-dimensional (3D) virtual objects.

In accordance with another aspect of the invention, the step of utilizing the vertex shader program of a GPU comprises utilizing the vertex shader program of a highly vectorized GPU.

In accordance with another aspect of the invention, the step of rendering a dynamic 3D object is performed in real-time.

In accordance with another aspect of the invention, the step of rendering a dynamic 3D object is performed for a succession of the dynamic 3D virtual objects so as to provide real-time animation.

In accordance with another aspect of the invention, a method comprises overlaying the rendered dynamic 3D object onto an optical view or video view of a real world for Augmented Reality visualization.

In accordance with another aspect of the invention, a method for visualization of dynamic three-dimensional (3D) virtual objects, comprises: storing a plurality of static 3D key-models of a dynamic 3D object in different poses; storing an indexed face-set describing a triangulated surface mesh with vertex indices wherein each vertex has a corresponding vertex in each of the other static 3D key-models of the plurality, the vertices respectively comprising other attributes, including any of position, color, texture, and normal vector information; performing real-time interpolation of corresponding vertex coordinates in between static 3D key-models in a vertex shader program of a programmable graphics processing unit (GPU) by entering first and second vertex information of respective first and second static 3D key-models into respective attribute inputs of an OpenGI vertex; and performing actual interpolation of the first and second vertices in the vertex shader program of the programmable GPU.

In accordance with another aspect of the invention, a, method includes repeating the step of performing real-time interpolation for successive pairs of vertices of the plurality.

In accordance with another aspect of the invention, a method comprises: entering the first vertex information into the position, normal, color, and texture attributes of the OpenGI vertex; and entering the second vertex information into four remaining texture coordinates of the OpenGL vertex.

In accordance with another aspect of the invention, a method for visualization of dynamic three-dimensional (3D) virtual objects, comprises: storing a plurality of static 3D key-models of a dynamic 3D object in different poses; storing fstoring an indexed face-set describing a triangulated surface mesh with vertex indices wherein each vertex has a corresponding vertex in each of the other static 3D key-models of the plurality, the vertices respectively comprising other attributes, including any of color, texture, and normal vector information; and performing real-time interpolation of corresponding vertex coordinates in between static 3D key-models in a vertex shader program of a programmable GPU by:
  entering vertex information of a first static 3D key-model of the plurality into respective position, normal, color, and texture attributes of an OpenGI vertex,
  entering vertex information of a second static 3D key-model of the plurality into four respective remaining texture coordinates of the OpenGL vertex, and
  performing actual interpolation of first and second vertices in the vertex shader program of the programmable GPU.

In accordance with another aspect of the invention, a method for visualization of dynamic three-dimensional (3D) virtual objects, comprises: storing a plurality of static 3D key-models of a dynamic 3D object in different poses; storing an indexed face-set describing a triangulated surface mesh with vertex indices wherein each vertex has a corresponding vertex in each of the other static 3D key-models of the plurality, the vertices respectively comprising other attributes, including any of color, texture, and normal vector information; entering vertex information of a first static 3D key-model of the plurality into the position, normal, color, and texture attributes of an OpenGl vertex; and performing real-time interpolation of corresponding vertex coordinates in between static 3D key-models in a vertex shader program of a programmable GPU by:

assigning, to each vertex, information of first and second corresponding vertices of respective first and second static 3D key-models of the plurality, putting the first vertex information of the first static 3D key-model into the position, normal, color, and texture attributes of the OpenGL vertex, putting the second vertex information of the second static 3D key-model into four remaining texture coordinates of the OpenGL vertex, and performing actual interpolation of first and second vertices in the vertex shader program of the programmable GPU.

In accordance with another aspect of the invention, a method for visualization of dynamic three-dimensional (3D) virtual objects, comprises: generating a plurality of static 3D key-models of a dynamic 3D object in different poses; incorporating attributes, including any of color, texture, and normal vector information, in the 3D key-models with GPU acceleration; exporting the static 3D key-models into respective separate model files; importing the static 3D key-models from the model files into a visualization algorithm; storing an indexed face-set which is the same for all the static 3D key-models of the plurality, the indexed face-set describing a triangulated surface mesh with vertex indices wherein each vertex has a corresponding vertex in all other static 3D key-models of the plurality; extending information for all vertices in each static 3D key-model to comprise other attributes, including any of color, texture, and normal vector information; entering vertex information of a first static 3D key-model of the plurality into the position, normal, color, and texture attributes of an OpenGl vertex; entering vertex information of a second static 3D key-model of the plurality into respective attributes of an OpenGl vertex; implementing dynamics of the surface mesh by performing real-time interpolation of corresponding vertex coordinates in between the first and second static 3D key-models, the interpolation comprising performing the interpolation in a vertex shader program of a programmable GPU by assigning, to each vertex, information of first and second corresponding vertices of the first and a second static 3D key-models of the plurality, respectively; and inputting the vertex information of the first static 3D key-model into the position, normal, color, and texture attributes of the OpenGl vertex, so that the interpolation of the first and second vertices is achieved in the vertex shader program on the GPU.

In accordance with another aspect of the invention, a method for visualization of dynamic three-dimensional (3D) virtual objects, comprising: storing a plurality of static 3D key-models of a dynamic 3D object in different poses; storing an indexed face-set describing a triangulated surface mesh with vertex indices wherein each vertex has a corresponding vertex in each of the other static 3D key-models of the plurality, the vertices respectively comprising other attributes, including any of color, texture, and normal vector information; performing real-time interpolation of corresponding vertex coordinates in between static 3D key-models in a vertex shader program of a programmable GPU by entering first and second vertex information of respective first and second static 3D key-models into respective attribute inputs of an OpenGl vertex; and performing actual interpolation of the first and second vertices in the vertex shader program of the programmable GPU.

In accordance with another aspect of the invention, a method includes repeating the step of performing real-time interpolation for successive pairs of vertices of the plurality.

In accordance with another aspect of the invention, a method for visualization of dynamic three-dimensional (3D) virtual objects, comprises: storing a plurality of static 3D key-models of a dynamic 3D object in different poses; storing an indexed face-set describing a triangulated surface mesh with vertex indices wherein each vertex has a corresponding vertex in each of the other static 3D key-models of the plurality, the vertices respectively comprising other attributes, including any of color, texture, and normal vector information; and performing real-time interpolation of corresponding vertex coordinates in between static 3D key-models in a vertex shader program of a programmable GPU by entering vertex information of first and second static 3D key-models of the plurality into respective position, normal, color, texture, and other attributes of an OpenGl vertex and assigning, to each vertex, information of two respective corresponding vertices of the first and a second static 3D key-models of the plurality and deriving interpolation of the first and second vertices in a vertex shader program on the GPU by entering the vertex information of the first static 3D key-model into the position, normal, color, and texture attributes of the OpenGl vertex.

In accordance with another aspect of the invention, a method for visualization of dynamic three-dimensional (3D) virtual objects, comprises: storing storing a plurality of static 3D key-models of a dynamic 3D object in different poses; rendering the dynamic 3D object by interpolating between pairs of the static 3D key-models on a programmable graphics processing unit (GPU), wherein the interpolating is accomplished in a vertex shader program of the GPU; describing a particular action of the dynamic 3D object as a sequence of static 3D key-models; and scripting an animation as a sequence of given actions.

In accordance with another aspect of the invention, a system for visualization of dynamic three-dimensional (3D) objects, comprises a system for storing a plurality of static 3D key-models respectively describing a dynamic virtual 3D object in one or more poses and one or more shapes; a system for rendering the dynamic 3D object by interpolation of the 3D key-models; and system for performing the interpolation between the static 3D key-models in a vertex shader program of a programmable graphics processing unit (GPU).

In accordance with another aspect of the invention, a method for visualization of dynamic three-dimensional (3D) virtual objects comprises storing a plurality of static 3D key-models respectively describing a dynamic 3D object in at least one of a number of poses and shapes; and rendering the dynamic 3D object by interpolation of the 3D key-models by performing the interpolation in a vertex shader program of a programmable graphics processing unit (GPU).

In accordance with another aspect of the invention, a system for visualization of dynamic three-dimensional (3D) objects, comprises an AR system for rendering 3D graphics including objects from a real world, augmented with the dynamic 3D objects.

In accordance with another aspect of the invention, the objects from a real world are interactive with the dynamic three-dimensional (3D) virtual objects.

In accordance with another aspect of the invention, the AR system interactive and comprises a computing graphic system for rendering graphics, a display system for displaying the graphics, a tracking system for tracking a user's viewpoint and/or objects in the scene and/or instruments, a computer memory for storing graphical objects to be displayed, and a computing system to receive information from any of the tracking system and input devices and other devices, 3D information of real objects, and information on the real world.

In accordance with another aspect of the invention, a system includes a system for providing appropriate occlusion of the virtual objects by the objects from a real world and appropriate occlusion of the objects from a real world by the virtual objects.

In accordance with another aspect of the invention, a system includes system for enabling a user to trigger a new script by interacting with the dynamic 3D object.

In accordance with another aspect of the invention, a system in accordance with claim 40, wherein the system comprises any of a mouse, another input device, and menus triggered by a gaze interface.

BRIEF DESCRIPTION OF THE SEVERAL VIEWS OF THE DRAWINGS

The invention will be more fully understood from the detailed description which follows, in conjunction with the drawings, in which

FIGS. 4A and 4B show an animated character in an AR setup moving through a real miniature environment with proper occlusions and triggered by user interaction, in accordance with aspects of the present invention.

DETAILED DESCRIPTION OF THE INVENTION

Briefly, in accordance with an aspect of the present invention, dynamic 3D objects are displayed by means of programmable graphics hardware. Several static 3D key-models that describe the dynamic 3D object in different poses or shapes are used. In an embodiment of the invention, standard modeling tools, e.g. Maya, can be used to generate these static 3D key-models.

Figure 1:
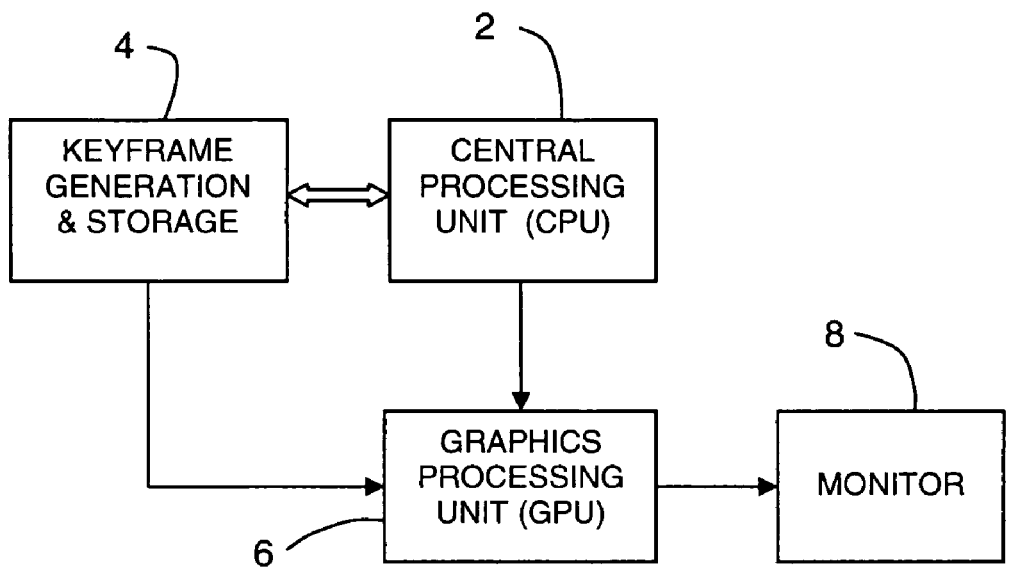
FIG. 1 shows a block diagram of a set-up in accordance with principles of the present invention.

FIG. 1 shows a block diagram of a set-up in accordance with principles of the present invention, wherein 2 denotes a central processing unit (CPU), 4 denotes the generation and storage of keyframes, wherein both are coupled to a graphics processing unit 6 whose output is coupled to a monitor 8.

A central aspect of the method in accordance with invention comprises rendering the dynamic 3D object by way of a particular, hardware-assisted interpolation of the 3D key-models. With the vertex shader program of a highly vectorized graphics processing unit (GPU), which is available on today's graphics cards, the method achieves real-time animation of complex objects.

Augmented Reality visualization, where computer graphics is overlaid onto an optical or video view of the real world, poses particularly high demands on rendering speed, and, as was stated above, is an important area of application for the present invention, As noted above, it is herein recognized that one must either pre-calculate all intermediate shapes and thereby sacrifice the system's interactivity, which is not desirable for AR applications, or else, one must simplify the model, which again, is an undesired limitation.

It is herein also recognized that there is a need for a method for fast graphics rendering of animated complex 3D objects. In accordance with a principle of the present invention, a concept of 3D key-models is herein disclosed and a method is described for utilizing this on modern graphics cards to achieve real-time animation for Augmented Reality systems.

With the advent of high level shading languages, along with the precision, performance, and level of programmability of the current generation of Graphics Processing Units (GPU's) such as Nvidia NV30/NV35 architecture, it is herein recognized that complex operations can be performed on the graphics adapter. A GPU comprises the microprocessor of a graphics card (or graphics accelerator) for a computer, and is typically efficient at manipulating and displaying computer graphics.

In accordance wih an aspect of the present invention, a GPU is utilized to perform the visualization of dynamic 3D objects, as will be explained in more detail below.

In accordance with an aspect of the present invention, a method for visualization of dynamic three-dimensional virtual objects comprises generating and exporting static 3D key-models of a dynamic 3D object in different poses from a modeling tool into separate model files and importing these into a visualization algorithm. Thus, the interface between the modeling tool and the visualization method is kept simple; basically, only static 3D geometry information has to be transferred by means of these files containing the static 3D models. There is no need for a complex model file parser, such as a VRML2 parser, to import the whole dynamic 3D object. The presumption exists that the model mesh points have a one-to-one mapping between the static 3D key-models, that is, each vertex has a corresponding vertex in all the other static 3D key-models, such as, for example, the nose-tip of a virtual figure must correspond to the nose tip in all static 3D key-models, and so forth.

Only one indexed face-set is stored, which is the same for all static 3D key-models, and which describes a triangulated surface mesh with vertex indices The dynamics of the surface mesh is implemented by real-time interpolation of corresponding vertex coordinates in between static 3D key-models.

The information for all vertices in each static 3D key-model in the modeling phase is extended to include other attributes, such as color, texture, and normal vector information. Combined with the above-mentioned real-time interpolation, this permits the visualization of dynamic color, texture, and appearance transitions and/or other attributes of the dynamic 3D object in addition to its motion dynamics.

A preferred embodiment of the present invention includes the above-mentioned real-time interpolation of corresponding vertex coordinates in between the static 3D key-models, and the extension of the information for all vertices in each static 3D key-model in the modeling-phase to include other attributes, with GPU acceleration. The real-time interpolation is implemented in a vertex shader program of a programmable GPU. By utilizing the multi-texturing capabilities of current graphics hardware, there is assigned to each vertex the information of two corresponding vertices of two static 3D key-models.

The vertex information of the first static 3D key-model is put into the position, normal, color, and texture attributes of the OpenGL vertex. The information of the vertex of the second static 3D key-model is put into four of the remaining texture coordinates of the same OpenGL vertex. The actual interpolation of the two vertices is achieved in the vertex shader program on the GPU. See FIG. 2, which shows a schematic representation of the usage, in accordance with principles of the present invention, of a GPU vertex shader for the generation of a dynamic 3D object from the input of two different static 3D key-models of the object. The "keyFrame-Blend" parameter controls the linear interpolation between both static 3D key-models. See Table 1 below, which provides an example of Cg code for the linear interpolation of static 3D key-models on programmable vertex shaders.

TABLE 1

```
struct vert
{
float4 position         : POSITION;
float3 normal           : NORMAL;
float3 color            : COLOR;
float3 texCoord         : TEXCOORD0;
};
vert main(      float4 position1       : POSITION,
                float4 normal1         : NORMAL
                float4 color1          : COLOR
                float4 texCoord1       : TEXCOORD0,
                float4 position2       : TEXCOORD1,
                float4 normal2         : TEXCOORD2,
                float4 color2          : TEXCOORD3,
                float4 texCoord2       : TEXCOORD4,
                uniform float keyFrameBlend,
                uniform float4x4 ModelViewProj )
{
vert OUT;
OUT.position    = mul { ModelViewProj, ( lerp(position1,
                  position2,
                      keyFrameBlend ) ) );
OUT.normal      = normalize( lerp(normal1, normal2,
                  keyFrameBlend) ) );
OUT.color               = lerp(color1, color2,
                  keyFrameBlend );
OUT.texCoord    = lerp( texCoord1, texCoord2, keyFrameBlend );
return OUT;
```

In accordance with an embodiment of the present invention, the linear interpolation of the vertex attributes is controlled by a single parameter, which enables arbitrarily fast and slow, and always smooth dynamics.

A plurality of basic movements in between static 3D key-models are put together in a sequential order to describe particular typical complex dynamics of a dynamic 3D object. More complex movements can be generated as a sequence of basic movements. By way of example, in the description of the dynamics of an animated figure, several basic movements are put together to describe an action of the figure, such as jumping, walking, or running. A complete animation of an animated figure can be described with a set of these actions.

The dynamics of a dynamic 3D object may be triggered by any of a variety of sources, such as a timer, random generator, the environment, such as for example, the presence of a wall, or through user interaction by gesture, by a mouse or mouse-like input device, by a tracked pointer or other instrument. The dynamics of the virtual object and the viewpoint can be completely interactive, since they are not pre-calculated.

In accordance with principles of the present invention, user interaction can be caused to trigger different kinds of movements such as, for example, walking, standing, turning a head, lifting an arm, and so forth, or can result in different ways or directions of performing predetermined movement sequences, such as walking fast or slow, left or right, and so forth.

Figure 3:
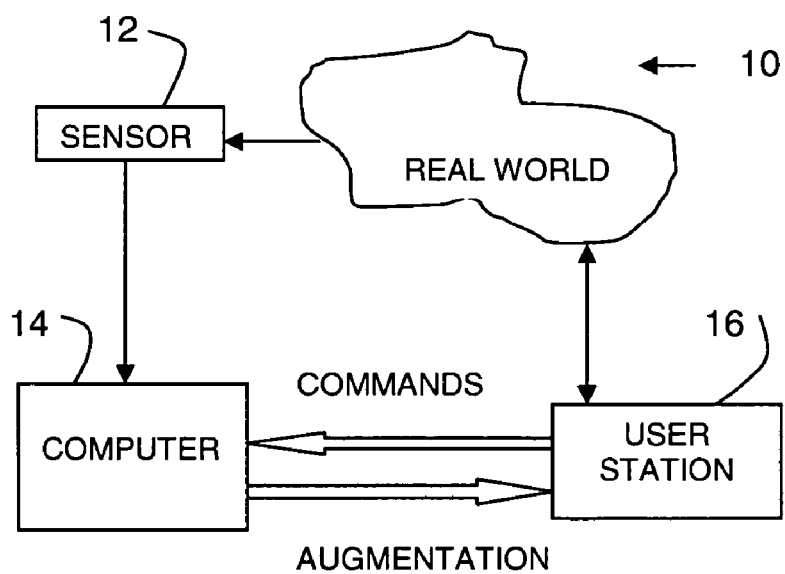
FIG. 3 shows a block diagram of an augmented reality set-up, with a user station including therein apparatus in accordance with the present invention as applied to augmented reality.

In accordance with principles of the present invention, visualization in the area of Augmented Reality (AR) can be used to augment real world scenery with dynamic 3D objects, such as animated figures or by deforming virtual objects. FIG. 3 shows a block diagram of an AR set-up. A real world 10 is sensed by a sensor 12 which communicates with a computer 14. A user station 16 incorporates apparatus in accordance with the present invention for visualization of dynamic 3D virtual objects, and receives inputs from a user and communicates with computer 14 and with real world 10.

In accordance with principles of the present invention, an AR system, which is in principle known per se in the prior art, includes a computing graphic system for rendering graphics, a display system for displaying the graphics, a tracking system for tracking the user's viewpoint and/or objects in the scene and/or instruments, a computer memory for storing graphical objects to be displayed, a computing system to receive information from the tracking system and input devices, and so forth. Calibration of the system is necessary and can be performed according to known methods. See the afore-mentioned work by F. Sauer, F. Wenzel, S. Vogt, Y. Tao, Y. Genc, and A. Bani-Hashemi, "Augmented Workspace: Designing an AR Testbed".

Proper occlusion between the real and virtual objects, as perceived through an AR system, can be achieved if, in addition to the view of the real world, 3D information of the real objects is also available. Having a 3D computer model (CAD model) either by performing a 3D scan of the object or by building the real object according to this CAD model, permits the AR system to render augmenting 3D graphics "behind" real world objects. Partial and complete occlusions of virtual objects by real objects become possible once the location of the real object in the world coordinate system is known by means of tracking and registration. The CAD model is rendered onto the (video) view of the real world before the actual virtual objects are rendered. The way the CAD model is rendered herein differs from the way the augmenting graphics are rendered herein. Since the CAD model is already visualized—as part of the real world (video) image in the form of a real object—the technique masks out rendering the model into the color buffers of the graphics system and only renders it into the depth buffer.

This rendering method essentially does not created anything that is visible to the user's eye; it only establishes a proper pixel-based depth map at the 2D image location of the real object. Subsequent rendering of virtual objects now takes into account the 3D information of the real object in the same way as it takes into account the 3D information of other virtual objects. Thus, proper occlusion between real and virtual worlds is achieved on a pixel level.

An example for illustrating an embodiment of the invention in an interactive experimental set-up is described next. In preparation, a miniature virtual scene is designed in the computer and a real copy of it is built—with real objects as prescribed in the 3D computer model. The user wears a head-mounted display and perceives an augmented view of this real scene. The real scene is augmented with an animated virtual character—for example, a little comic-like figure that interacts with the real miniature environment and the user. Typically, the character is walking through its confined real environment, climbing up stairs, jumping down walls, and playing virtual instruments that augment the scene. Besides the animated character, the augmented scene includes visible static virtual objects, such as musical instruments, and invisible static virtual objects corresponding to the real objects in the scene. The latter ensure that in the augmented view the animated character appears correctly occluded by the real objects. The character is implemented in the form of a dynamic 3D object based on pre-generated static 3D key-models according to the present invention. Occlusion is properly handled in situations such as when the character walks through arches or moves behind walls. See FIGS. 4A and 4B, described above. FIGS. 4A and 4B show an animated character in an AR setup moving through a real miniature environment with proper occlusions and triggered by user interaction, in accordance with an aspect of the present invention. Basically, several static 3D key-models define each particular action of this character, such as walking straight, turning, jumping, playing an instrument, and so forth. By gaze-control the user triggers the character's actions: for example, looking at one of the instruments for two seconds triggers the character to find a path through the environment, walk to the instrument, and play the instrument. For gaze-control, refer to patent application Ser. No. 10/222,284, filed Aug. 16, 2002, in the names of F. Sauer, A. Khamene, L. Schimmang, entitled "User Interface for Augmented and Virtual Reality Systems," and whereof the disclosure is incorporated herein by reference.

Directing one's gaze to the character's head can trigger reactions such as looking up, turning away, and so forth. Realizing an interactive scene or game similar to the one described here involves defining scripts, which put several actions of a character into a unique sequence. Complex movements like walking are described as a sequence of 3D key-models, interpolated and rendered at a pace that yields the movement in the desired speed. Scripts are used to define reactions of the character to user input or predetermined default actions. These reactions/actions can be quite complex sequences: for example, setting out on a predetermined path to predetermined location to perform a predetermined activity. Actions can be movements, color changes, audio responses, such as speech, music, noises, and so forth, of the character, or of other objects in the scene.

The user can trigger a new script by interacting with the character, and can change parameters of the script, such as speed of the character's movement, by additional interaction with the system, for example, with a mouse or other input device, or with menus triggered by the gaze interface. User interaction can preferably also be accomplished with a device the location of which is being tracked and which can be represented as a virtual instrument in the scene. The concept for interaction with 3D data sets is herein used for interaction with a 3D scene; it is described in patent application Ser. No. 10/365,194, filed on Feb. 12, 2003 in the names of F. Sauer, J. Williams, and A. Khamene, and entitled "User Interface for Three-dimensional Data Sets," and whereof the disclosure is herein incorporated by reference.

The animation of the virtual character in this example is implemented with an hierarchical method as set forth above in detail, including the featured steps of implementing the real-time interpolation in a vertex shader program of a programmable GPU; controlling the linear interpolation of the vertex attributes by a single parameter; and putting together a plurality of basic movements in between static 3D key-models in a sequential order to describe particular typical complex dynamics of a dynamic 3D object.

Three implementation layers are distinguished, from bottom to top:
(a) Interpolation between two static 3D key-models on the GPU;
(b) description of a particular action as a sequence of static 3D key-models; and
(c) scripting of an animation as a sequence of certain actions.

Figure 2:
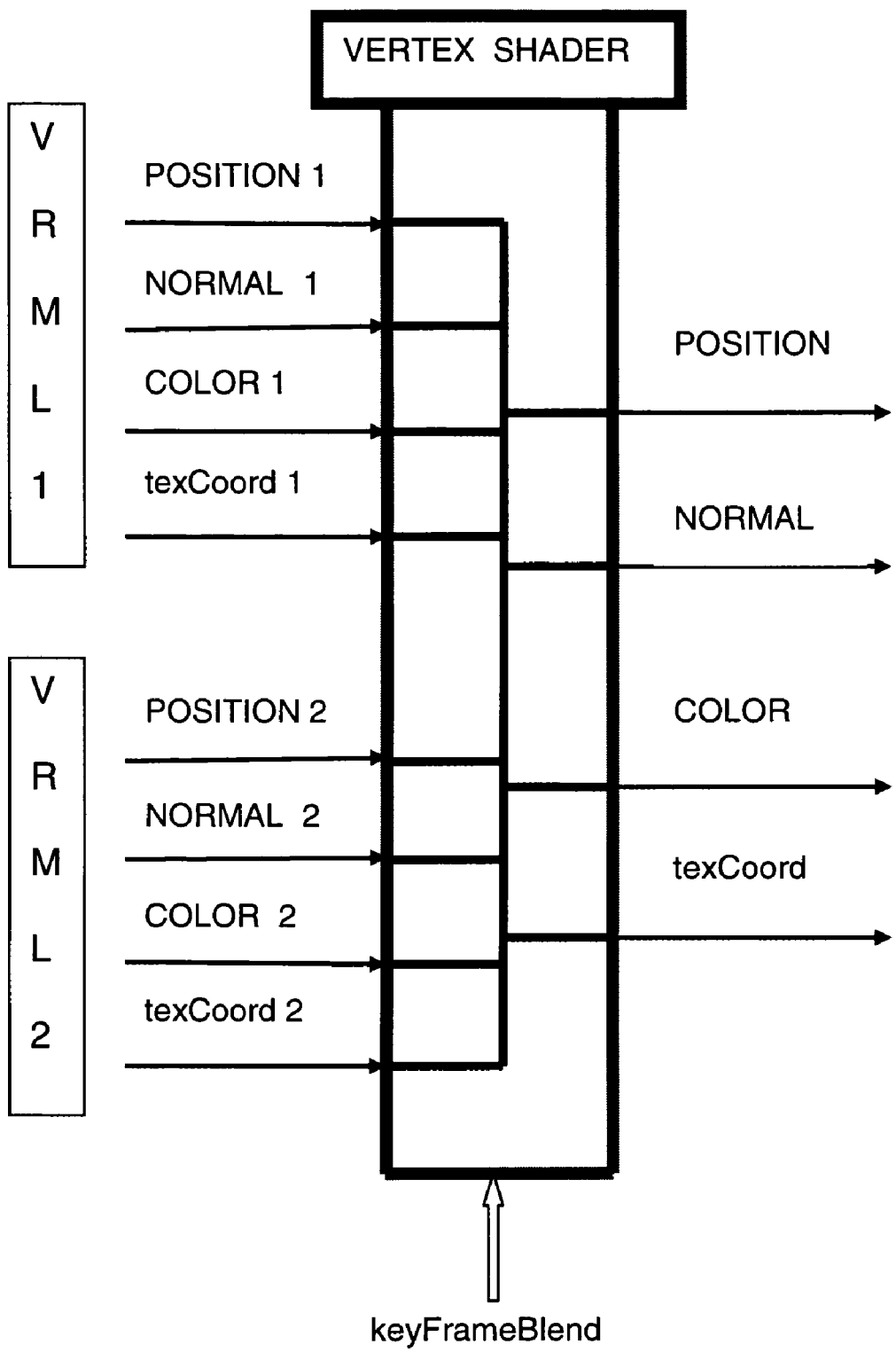
FIG. 2 shows a schematic representation of the usage, in accordance with principles of the present invention, of a GPU vertex shader for the generation of a dynamic 3D object from the input of two different static 3D key-models of the object. The "keyFrameBlend" parameter controls the linear interpolation between both static 3D key-models.

Several 3D models of that little comic-like figure were created in different poses with Maya and were imported as static 3D key-models into the AR system in accordance with the present invention. The interpolation between any two of those static 3D key-modes, that is, implementation layer (a), is accomplished by the GPU vertex shader program as depicted in FIG. 2 and Table 1. The dynamics in between both static 3D key-models is achieved by slowly increasing the parameter keyFrameBlend from 0.0 to 1.0 at each new rendering process.

Several actions for the figure are described, such as walking, jumping, or playing a viola, by putting a set of static 3D key-models into a predefined sequence, that is, implementation layer (b). The following pseudo-code in Table 2 demonstrates the procedure for visualizing the figure while playing a viola, which is based on four static 3D key-models, A, B, C, D.

TABLE 2

Function playViola(durationTicks)
    actionTick = globalTick − actionStartTick
    interpolation = fraction(actionTick/durationTicks) * 4
    cgGLSetParameter1f(keyFrameBlend,
fraction(interpolation))
        glCallList(FigureWithViola[integer(interpolation)])
  End Function This function would be called as part of each new global rendering step, where globalTick increases by 1 and the whole scene is being re-rendered. The durationTicks parameter specifies how many rendering steps this particular action should last and thus specifies the period of time for the figure to perform it. The interpolation variable monotonically increases over this period from 0.0 until just before it reaches 4.0. Hereby the integer part denotes the pair of static 3D key-frames to be rendered (0: A-B, 1: B-C, 2: C-D, 3: D-A) and the fraction part denotes the progress in between two static 3D key-frames.

As stated above, the figure interacts with its environment. Every kind of interaction triggers a special animation of the figure. Each animation follows a script with a sequence of actions (that is, implementation layer (c)). As an example, the user might want to let the little figure play the viola and selects the virtual viola, which is augmented at a certain location in the real miniature world, by gaze control. The figure has to walk, turn, and jump up stairs to reach that spot and to play the instrument. To accomplish this, it has to follow a script of actions such as the example shown below in Table 3:

TABLE 3

Script violaAnimation
    walkStart
    walkCircle
    walk
    walkCircle
    walk
    walkStop
    jump
    walkStart
    walk
    walkStop
    playViolaStart
    playViola
    playViolaEnd
    walkStart TABLE 3-continued

```
walk
walkStop
jump
walkStart
walkCircle
walk
walkStop
End Script
```

Each of these actions is implemented as explained in the foregoing paragraph and parameterized with one or more action-specific parameters (which would follow in brackets after each action).

As stated and as will be apparent, the present invention is intended to be implemented with the use and application of a programmed digital computer. Inputs may be made directly, or by communication with another computer or device by way of direct connection, a modulated infrared beam, radio, land line, facsimile, or satellite as, for example, by way of the World Wide Web or Internet, or any other appropriate source of such data. The output device may include a computer type display device using any suitable apparatus such as a cathode-ray kinescope tube, a plasma display, liquid crystal display, and so forth, or it may include memory for storing an image for further processing, or for viewing, or evaluation, as may be convenient, or it may utilize a connection or coupling including such as are noted above in relation to the input. The processor is operative with a program set up in accordance with the present invention for implementing steps of the invention. Such a programmed computer may interface readily through communications media such as land line, radio, the Internet, and so forth for image data acquisition and transmission.

The invention may be readily implemented, at least in part, in a software memory device and packaged in that form as a software product. This can be in the form of a computer program product comprising a computer useable medium having computer program logic recorded thereon for program code for performing image motion compensation utilizing the method of the present invention.

The present invention has been explained by way of examples using illustrative exemplary embodiments. It will be understood that the description by way of exemplary embodiments is not intended to be limiting and that various changes and substitutions not herein explicitly described may be made without departing from the spirit and scope of the invention which is defined by the claims following.

What is claimed is:

1. A method for visualization of dynamic three-dimensional (3D) virtual objects performed by a computer system including a central processing unit (CPU) and a programmable graphics processing unit (GPU), comprising:
    using an exporting unit to export a plurality of static 3D key-models, respectively describing a dynamic 3D object in at least one of a number of poses and shapes, into respective separate model files;
    using an importing unit to import said static 3D key-models from said model files into a visualization algorithm;
    using a central processing unit (CPU) to store the plurality of static 3D key-models and to store a single indexed face-set, for the entire plurality of static 3D key-models, said indexed face-set describing a triangulated surface mesh with vertex indices wherein each vertex has a corresponding vertex in each of the other static 3D key-models of said plurality such that there is one-to-one mapping between all of the static 3D key-models of said plurality and such that the single indexed face set is used to match all vertices for the entire plurality of static 3D key-models;
    using an extending unit to extend information for all vertices in each static 3D key-model to comprise other attributes, including any of color, texture, and normal vector information;
    using a programmable graphics processing unit (GPU) to access the stored static 3D key-models and render said dynamic 3D object by real-time interpolation of corresponding vertex coordinates in between said 3D key-models by performing said interpolation in a vertex shader program of said GPU,
    wherein the dynamic 3D object is rendered along with one or more invisible static virtual objects that correspond to real objects in a real world scene.

2. A method in accordance with claim 1, wherein said step of performing interpolation between said static 3D key-models comprises entering first and second vertex information of respective first and second static 3D key-models into respective attribute inputs of an OpenGL vertex.

3. A method in accordance with claim 2, wherein said step of entering first and second vertex information comprises entering attributes, including any of color, texture, and normal vector information.

4. A method in accordance with claim 1, including:
    coupling said virtual objects with an AR system for rendering 3D graphics including the real objects from the real world, augmented with said virtual dynamic 3D objects.

5. A method in accordance with claim 4, including:
    interacting said objects from said real world with said virtual dynamic 3D virtual objects.

6. A method in accordance with claim 4, comprising:
    said performing said interpolation comprises implementing real-time interpolation;
    controlling said interpolation by a single parameter;
    combining a plurality of basic movements in between static 3D key-models in a sequential order to describe particular complex dynamics of a dynamic 3D object;
    describing a particular action as a sequence of static 3D key-models; and
    scripting an animation sequence as a sequence of given actions.

7. A method for visualization of dynamic three-dimensional (3D) virtual objects performed by a computer system including a central processing unit (CPU) and a programmable graphics processing unit (GPU), comprising:
    using a central processing unit (CPU) to generate a plurality of static 3D key-models describing one of said dynamic 3D virtual objects in at least one of different poses and shapes;
    using an exporting unit to export the plurality of static 3D key-models into respective separate model files;
    using an importing unit to import said static 3D key-models from said model files into a visualization algorithm;
    using said CPU to store a single indexed face-set, for the entire plurality of static 3D key models, said indexed face-set describing a triangulated surface mesh with vertex indices wherein each vertex has a corresponding vertex in each of the other static 3D key-models of said plurality such that there is one-to-one mapping between all of the static 3D key-models of said plurality and such that the single indexed face set is used to match all vertices for the entire plurality of static 3D key-models;

using an extending unit to extend information for all vertices in each static 3D key-model to comprise other attributes, including any of color, texture, and normal vector information; and using a graphics processing unit (GPU) to render said dynamic 3D object by way of real-time hardware-assisted interpolation of corresponding vertex coordinates in between said 3D key-models, wherein the dynamic 3D object is rendered along with one or more invisible static virtual objects that correspond to real objects in a real world scene.

8. A method in accordance with claim 7, wherein the GPU is a highly vectorized GPU.

9. A method objects in accordance with claim 7, wherein said step of rendering a dynamic 3D object is performed for a succession of said dynamic 3D virtual objects so as to provide real-time animation.

10. A method in accordance with claim 9, comprising:
overlaying said rendered dynamic 3D object onto an optical view or video view of the real world scene for Augmented Reality visualization.

11. A method for visualization of dynamic three-dimensional (3D) virtual objects performed by a computer system including a central processing unit (CPU) and a programmable graphics processing unit (GPU), comprising:
using an exporting unit to export a plurality of static 3D key-models of a dynamic 3D object in different poses into respective separate model files;
using an importing unit to import said static 3D key-models from said model files into a visualization algorithm;
using a central processing unit (CPU) to store the plurality of static 3D key-models and to store a single indexed face-set, for the entire plurality of static 3D key-models, said indexed face-set describing a triangulated surface mesh with vertex indices wherein each vertex has a corresponding vertex in each of the other static 3D key-models of said plurality such that there is a one-to-one mapping between all of the static 3D key-models of sad plurality and such that the single indexed face set is used to match all vertices for the entire plurality of static 3D key-models, said vertices respectively comprising other attributes, including any of position, color, texture, and normal vector information;
using an extending unit to extend information for all vertices in each static 3D key-model to comprise other attributes, including any of color, texture, and normal vector information; and
using a programmable graphics processing unit (GPU) to perform real-time interpolation of corresponding vertex coordinates in between said static 3D key-models in a vertex shader program of the programmable GPU by entering first and second vertex information of respective first and second static 3D key-models into respective attribute inputs of an OpenGL vertex and to perform actual interpolation of said first and second vertices in said vertex shader program of said programmable GPU to render the dynamic 3D object,
wherein the dynamic 3D object is rendered along with one or more invisible static virtual objects that correspond to real objects in a real world scene.

12. A method in accordance with claim 11, including repeating said step of performing real-time interpolation for successive pairs of vertices of said plurality.

13. A method in accordance with claim 12, comprising:
entering said first vertex information into the position, normal, color, and texture attributes of said OpenGL vertex; and
entering said second vertex information into four remaining texture coordinates of said OpenGL vertex.

14. A method for visualization of dynamic three-dimensional (3D) virtual objects performed by a computer system including a central processing unit (CPU) and a programmable graphics processing unit (GPU), comprising:
using an exporting unit to export a plurality of static 3D key-models of a dynamic 3D object in different poses into respective separate model files;
using an importing unit to import said static 3D key-models from said model files into a visualization algorithm;
using a central processing unit (CPU) to store the plurality of static 3D key-models and to store a single indexed face-set, for the entire plurality of static 3D key models, said indexed face-set describing a triangulated surface mesh with vertex indices wherein each vertex has a corresponding vertex in each of the other static 3D key-models of said plurality such that there is one-to-one mapping between all of the static 3D key-models of said plurality and such that the single indexed face set is used to match all vertices for the entire plurality of static 3D key-models, said vertices respectively comprising other attributes, including any of color, texture, and normal vector information;
using an extending unit to extend information for all vertices in each static 3D key-model to comprise other attributes, including any of color, texture, and normal vector information; and
using a programmable graphics processing unit (GPU) to perform real-time interpolation of corresponding vertex coordinates in between static 3D key-models in a vertex shader program of the programmable GPU to render the dynamic 3D object by:
entering vertex information of a first static 3D key-model of said plurality into respective position, normal, color, and texture attributes of an OpenGL vertex,
entering vertex information of a second static 3D key-model of said plurality into four respective remaining texture coordinates of said OpenGL vertex, and
performing actual interpolation of first and second vertices in said vertex shader program of said programmable GPU,
wherein the dynamic 3D object is rendered along with one or more invisible static virtual objects that correspond to real objects in a real world scene.

15. A method for visualization of dynamic three-dimensional (3D) virtual objects performed by a computer system including a central processing unit (CPU) and a programmable graphics processing unit (GPU), comprising:
using an exporting unit to export a plurality of static 3D key-models of a dynamic 3D object in different poses into respective separate model files;
using an importing unit to import said static 3D key-models from said model files into a visualization algorithm;
using a central processing unit (CPU) to store the plurality of static 3D key-models and to store a single indexed face-set, for the entire plurality of static 3D key models, said indexed face-set describing a triangulated surface mesh with vertex indices wherein each vertex has a corresponding vertex in each of the other static 3D key-models of said plurality such that there is one-to-one mapping between all of the static 3D key-models of said plurality and such that the single indexed face set is used to match all vertices for the entire plurality of static 3D key-models, said vertices respectively comprising other attributes, including any of color, texture, and normal vector information;

using an extending unit to extend information for all vertices in each static 3D key-model to comprise other attributes including any of color texture and normal vector information; and using a programmable graphics processing unit (GPU) to enter vertex information of a first static 3D key-model of said plurality into the position, normal, color, and texture attributes of an OpenGL vertex and to perform real-time interpolation of corresponding vertex coordinates in between static 3D key-models in a vertex shader program of the programmable GPU to render the dynamic 3D object by:

assigning, to each vertex, information of first and second corresponding vertices of respective first and second static 3D key-models of said plurality, putting said first vertex information of said first static 3D key-model into the position, normal, color, and texture attributes of said OpenGL vertex, putting said second vertex information of said second static 3D key-model into four remaining texture coordinates of said OpenGL vertex, and performing actual interpolation of first and second vertices in said vertex shader program of said programmable GPU, wherein the dynamic 3D object is rendered along with one or more invisible static virtual objects that correspond to real objects in a real world scene.

16. A method for visualization of dynamic three-dimensional (3D) virtual objects performed by a computer system including a central processing unit (CPU) and a programmable graphics processing unit (GPU), comprising:

using a static model generating unit to generate a plurality of static 3D key-models of a dynamic 3D object in different poses;

using a graphics processing unit (GPU) to incorporate attributes, including any of color, texture, and normal vector information, in said 3D key-models with GPU acceleration;

using an exporting unit to export said static 3D key-models into respective separate model files;

using an importing unit to import said static 3D key-models from said model files into a visualization algorithm;

using a storing unit to store a single indexed face-set, for the entire plurality of static 3D key models, said indexed face-set describing a triangulated surface mesh with vertex indices wherein each vertex has a corresponding vertex in each of the other static 3D key-models of said plurality such that there is one-to-one mapping between all of the static 3D key-models of said plurality;

using an extending unit to extend information for all vertices in each static 3D key-model to comprise other attributes, including any of color, texture, and normal vector information;

using a vertex shader program of the GPU to enter vertex information of a first static 3D key-model of said plurality into the position, normal, color, and texture attributes of an OpenGL vertex, to enter vertex information of a second static 3D key-model of said plurality into respective attributes of an OpenGL vertex, and to implement dynamics of said surface mesh by performing real-time interpolation of corresponding vertex coordinates in between said first and second static 3D key-models, said interpolation comprising performing said interpolation in said vertex shader program of a programmable GPU by assigning, to each vertex, information of first and second corresponding vertices of said first and a second static 3D key-models of said plurality, respectively; and using an inputting unit to input said vertex information of said first static 3D key-model into said position, normal, color, and texture attributes of said OpenGL vertex, so that said interpolation of said first and second vertices is achieved in said vertex shader program on said GPU to render the dynamic 3D object, wherein the dynamic 3D object is rendered along with one or more invisible static virtual objects that correspond to real objects in a real world scene.

17. A method for visualization of dynamic three-dimensional (3D) virtual objects performed by a computer system including a central processing unit (CPU) and a programmable graphics processing unit (GPU), comprising:

using an exporting unit to export a plurality of static 3D key-models of a dynamic 3D object in different poses into respective separate model files;

using an importing unit to import said static 3D key-models from said model files into a visualization algorithm;

using a central processing unit (CPU) to store the plurality of static 3D key-models;

using the CPU to store a single indexed face-set, for the entire plurality of static 3D key models, said indexed face-set describing a triangulated surface mesh with vertex indices wherein each vertex has a corresponding vertex in each of the other static 3D key-models of said plurality such that there is one-to-one mapping between all of the static 3D key-models of said plurality and such that the single indexed face set is used to match all vertices for the entire plurality of static 3D key-models, said vertices respectively comprising other attributes, including any of color, texture, and normal vector information;

using an extending unit to extend information for all vertices in each static 3D key-model to comprise other attributes, including any of color, texture, and normal vector information;

using a programmable graphics processing unit (GPU) to perform real-time interpolation of corresponding vertex coordinates in between static 3D key-models in a vertex shader program of the programmable GPU by entering first and second vertex information of respective first and second static 3D key-models into respective attribute inputs of an OpenGL vertex; and using the programmable GPU to perform actual interpolation of said first and second vertices in said vertex shader program of said programmable GPU to render the dynamic 3D object, wherein the dynamic 3D object is rendered along with one or more invisible static virtual objects that correspond to real objects in a real world scene.

18. A method in accordance with claim 17, including repeating said step of performing real-time interpolation for successive pairs of vertices of said plurality of static 3D key-models.

19. A method for visualization of dynamic three-dimensional (3D) virtual objects performed by a computer system including a central processing unit (CPU) and a programmable graphics processing unit (GPU), comprising:

using an exporting unit to export a plurality of static 3D key-models of a dynamic 3D object in different poses into respective separate model files;

using an importing unit to import said static 3D key-models from said model files into a visualization algorithm;

using a central processing unit (CPU) to store the plurality of static 3D key-models;

using the central processing unit (CPU) to store a single indexed face-set, for the entire plurality of static 3D key models, said indexed face-set describing a triangulated surface mesh with vertex indices wherein each vertex has a corresponding vertex in each of the other static 3D key-models of said plurality such that there is one-to-one mapping between all of the static 3D key-models of said plurality and such that the single indexed face set is used to match all vertices for the entire plurality of static 3D key-models, said vertices respectively comprising other attributes, including any of color, texture, and normal vector information;

using an extending unit to extend information for all vertices in each static 3D key-model to comprise other attributes, including any of color, texture, and normal vector information; and using a programmable graphics processing unit (GPU) to perform real-time interpolation of corresponding vertex coordinates in between static 3D key-models in a vertex shader program of the programmable GPU to render the dynamic 3D object by entering vertex information of first and second static 3D key-models of said plurality into respective position, normal, color, texture, and other attributes of an OpenGL vertex and assigning, to each vertex, information of two respective corresponding vertices of said first and a second static 3D key-models of said plurality and deriving interpolation of said first and second vertices in a vertex shader program on said GPU by entering said vertex information of said first static 3D key-model into said position, normal, color, and texture attributes of said OpenGL vertex, wherein the dynamic 3D object is rendered along with one or more invisible static virtual objects that correspond to real objects in a real world scene.

20. A method for visualization of dynamic three-dimensional (3D) virtual objects performed by a computer system including a central processing unit (CPU) and a programmable graphics processing unit (GPU), comprising:

using an exporting unit to export a plurality of static 3D key-models of a dynamic 3D object in different poses into respective separate model files;

using an importing unit to import said static 3D key-models from said model files into a visualization algorithm;

using a central processing unit (CPU) to store the plurality of static 3D key-models and to store a single indexed face-set, for the entire plurality of static 3D key models, said indexed face-set describing a triangulated surface mesh with vertex indices wherein each vertex has a corresponding vertex in each of the other static 3D key-models of said plurality such that there is one-to-one mapping between all of the static 3D key-models of said plurality and such that the single indexed face set is used to match all vertices for the entire plurality of static 3D key-models;

using an extending unit to extend information for all vertices in each static 3D key-model to comprise other attributes, including any of color, texture, and normal vector information; and using a programmable graphics processing unit (GPU) for rendering said dynamic 3D object by interpolating corresponding vertex coordinates, in real-time, between pairs of said static 3D key-models on a programmable graphics processing unit (GPU), wherein said interpolating is accomplished in a vertex shader program of said GPU, describing a particular action of said dynamic 3D object as a sequence of static 3D key-models, and scripting an animation as a sequence of given actions, wherein the dynamic 3D object is rendered along with one or more invisible static virtual objects that correspond to real objects in a real world scene.

21. A method in accordance with claim 20, including putting a set of said static 3D key-models into a predefined sequence for describing a plurality of actions for dynamic 3D object, including any of walking, jumping, playing a viola and other actions.

22. A computer system comprising:

a central processing unit (CPU);

a programmable graphics processing unit (GPU); and a program storage device readable by the computer system, embodying a program of instructions executable by the processor to perform method steps for visualization of dynamic three-dimensional (3D) virtual objects, the method comprising:

using an exporting unit to export a plurality of static 3D key-models, respectively describing a dynamic 3D object in at least one of a number of poses and shapes into respective separate model files;

using an importing unit to import said static 3D key-models from said model files into a visualization algorithm;

using a central processing unit (CPU) to store the plurality of static 3D key-models and to store a single indexed face-set, for the entire plurality of static 3D key-models, said indexed face-set describing a triangulated surface mesh with vertex indices wherein each vertex has a corresponding vertex in each of the other static 3D key-models of said plurality such that there is one-to-one mapping between all of the static 3D key-models of said plurality and such that the single indexed face set is used to match all vertices for the entire plurality of static 3D key-models;

using an extending unit to extend information for all vertices in each static 3D key-model to comprise other attributes, including any of color, texture, and normal vector information;

using a programmable graphics processing unit (GPU) to access the stored static 3D key-models and rendering said dynamic 3D object by real-time interpolation of corresponding vertex coordinates in between said 3D key-models; and performing said interpolation between said static 3D key-models in a vertex shader program of the programmable graphics processing unit (GPU), wherein the dynamic 3D object is rendered along with one or more invisible static virtual objects that correspond to real objects in a real world scene.

23. A computer system in accordance with claim 22, wherein performing said interpolation comprises performing linear interpolation.

24. A computer system accordance with claim 23, wherein performing linear interpolation comprises performing linear interpolation of vertex attributes corresponding to said dynamic three-dimensional (3D) virtual objects.

25. A computer system in accordance with claim 23, wherein performing linear interpolation of vertex attributes includes controlling said linear interpolation by a single parameter.

26. A computer system in accordance with claim 23, wherein linear interpolation of the vertex attributes is controlled by a single parameter.

27. A computer system in accordance with claim 26, additionally including:

describing a particular action of said dynamic 3D object as a sequence of static 3D key-models; and scripting an animation as a sequence of given actions.

28. A computer system in accordance with claim 27, additionally including enabling a user to trigger a new script by interacting with said dynamic 3D object.

29. A computer system in accordance with claim 22, additionally including:

rendering 3D graphics including objects from a real world, augmented with said dynamic 3D objects using an AR system.

30. A computer system in accordance with claim 29, wherein said objects from a real world are interactive with said dynamic three-dimensional (3D) virtual objects.

31. A computer system in accordance with claim 30 wherein said AR system is interactive and comprises a computing graphic system for rendering graphics, a display system for displaying said graphics, a tracking system for tracking a user's viewpoint and/or objects in the scene and/or instruments, a computer memory for storing graphical objects to be displayed, and a computing system to receive information from any of said tracking system and input devices and other devices, 3D infolination of real objects, and information on said real world.

32. A computer system in accordance with claim 31, additionally including providing appropriate occlusion of said virtual objects by said objects from a real world and appropriate occlusion of said objects from a real world by said virtual objects.

33. A computer system in accordance with claim 32, additionally including enabling a user to trigger a new script by interacting with said dynamic 3D object.

34. A computer system in accordance with claim 28, wherein the user to triggers the new script using a mouse.

35. A computer system in accordance with claim 32, wherein providing appropriate occlusion comprises performing said occlusion at a pixel level.

36. A computer system in accordance with claim 35, wherein providing appropriate occlusion comprises performing said occlusion as a partial occlusion when so required by the constellation of occluding objects and occluded objects.

37. A computer system in accordance with claim 36, wherein said rendering of a virtual object takes account of 3D information of said objects from a real world and takes into account 3D information of other virtual objects.

38. A computer system in accordance with claim 37, wherein said dynamic 3D object comprises a virtual animated character in an AR setup moving through a real miniature environment with proper occlusions and triggered by user interaction.

39. A computer system in accordance with claim 38, additionally including implementing animation of said virtual character by:

performing said interpolation including implementing real-time interpolation and means for controlling said interpolation by a single parameter, and combining a plurality of basic movements in between static 3D key-models in a sequential order to describe particular complex dynamics of a dynamic 3D object, wherein a particular action is described as a sequence of static 3D key-models; and wherein an animation sequence as a sequence of given actions is scripted.

40. A computer system comprising:

a central processing unit (CPU);

a programmable graphics processing unit (GPU); and a program storage device readable by the computer system, embodying a program of instructions executable by the processor to perform method steps for visualization of dynamic three-dimensional (3D) virtual objects, the method comprising:

exporting a plurality of static 3D key-models of a dynamic 3D object in different poses respectively describing a dynamic 3D object in at least one of a number of poses and shapes into respective separate model files;

importing said static 3D key-models from said model files into a visualization algorithm;

storing the plurality of static 3D key-models;

storing a single indexed face-set, for the entire plurality of static 3D key models, said indexed face-set describing a triangulated surface mesh with vertex indices wherein each vertex has a corresponding vertex in each of the other static 3D key-models of said plurality such that there is one-to-one mapping between all of the static 3D key-models of said plurality and such that the single indexed face set is used to match all vertices for the entire plurality of static 3D key-models;

extending information for all vertices in each static 3D key-model to comprise other attributes, including any of color, texture, and normal vector information; and rendering said dynamic 3D object by real-time interpolation of corresponding vertex coordinates in between said 3D key-models by performing said interpolation in a vertex shader program of said programmable graphics processing unit (GPU), wherein the dynamic 3D object is rendered along with one or more invisible static virtual objects that correspond to real objects in a real world scene.

* * * * *